(12) United States Patent
Lin

(10) Patent No.: US 9,046,667 B2
(45) Date of Patent: Jun. 2, 2015

(54) PHOTOELECTRIC CONVERSION DEVICE AND OPTICAL FIBER COUPLING CONNECTOR

(71) Applicant: HON HAI PRECISION INDUSTRY CO., LTD., New Taipei (TW)

(72) Inventor: I-Thun Lin, New Taipei (TW)

(73) Assignee: HON HAI PRECISION INDUSTRY CO., LTD., New Taipei (TW)

(*) Notice: Subject to any disclaimer, the term of this patent is extended or adjusted under 35 U.S.C. 154(b) by 14 days.

(21) Appl. No.: 13/948,229

(22) Filed: Jul. 23, 2013

(65) Prior Publication Data

US 2014/0178017 A1    Jun. 26, 2014

(30) Foreign Application Priority Data

Dec. 26, 2012  (TW) .............................. 101150276 A

(51) Int. Cl.
| | | |
|---|---|---|
| G02B 6/32 | (2006.01) | |
| G02B 6/34 | (2006.01) | |
| G02B 6/43 | (2006.01) | |
| G02B 15/177 | (2006.01) | |
| G02B 6/42 | (2006.01) | |

(52) U.S. Cl.
CPC ................ G02B 6/43 (2013.01); *G02B 15/177* (2013.01); *G02B 6/421* (2013.01); G02B 6/4214 (2013.01); G02B 6/4246 (2013.01)

(58) Field of Classification Search
CPC ..................................................... G02B 15/177
USPC .................................................... 385/33, 36
See application file for complete search history.

(56) References Cited

U.S. PATENT DOCUMENTS

| 4,420,219 | A  * | 12/1983 | Muchel ............................ 385/74 |
| 7,489,840 | B2 * | 2/2009 | Sekiya et al. ................... 385/36 |
| 2004/0258354 | A1* | 12/2004 | Sekiya et al. .................. 385/35 |
| 2006/0008199 | A1* | 1/2006 | Glebov et al. .................. 385/15 |
| 2009/0148099 | A1* | 6/2009 | Sekiya et al. .................. 385/33 |

* cited by examiner

*Primary Examiner* — Eric Wong
*Assistant Examiner* — Mary El Shammaa
(74) *Attorney, Agent, or Firm* — Novak Druce Connolly Bove + Quigg LLP

(57) ABSTRACT

A photoelectric conversion device includes a circuit board, light-emitting modules, light-receiving modules, an optical coupling module, and a lens strip. The light-emitting modules and the light-receiving modules are mounted on the circuit board. The optical coupling module is mounted on the circuit board and includes first and second optical surfaces, a reflection surface, and first converging lenses formed on the second optical surface and corresponding to the light-emitting modules and the light-receiving modules. The lens strip is mounted on the circuit board and includes a body portion and second converging lenses. The body portion includes an upper surface and an opposing lower surface defining a receiving cavity. The second converging lenses are formed on the upper surface. The light-emitting modules and the light-receiving modules are received in the receiving cavity and are aligned with the second converging lenses.

10 Claims, 6 Drawing Sheets

US 9,046,667 B2

PHOTOELECTRIC CONVERSION DEVICE AND OPTICAL FIBER COUPLING CONNECTOR

BACKGROUND

1. Technical Field

The present disclosure relates to communication technologies, and particularly to a photoelectric conversion device and an optical fiber coupling connector.

2. Description of Related Art

An optical fiber coupling connector includes a photoelectric conversion device and a number of optical fibers. The photoelectric conversion device includes a number of light-emitting modules, a number of light-receiving modules, and an optical coupling module. The optical fibers correspond to and are optically coupled with the light-emitting modules and the light-receiving modules one-to-one through the optical coupling module. Each of the optical fibers includes a core portion and a cladding layer partially wrapping around the core portion. The optical coupling module is configured for guiding light emitted from the light-emitting modules to the core portions of the corresponding optical fibers and for guiding light from the core portions of the optical fibers to the corresponding light-receiving modules.

The diameter of each of the core portions is very small, for example, the diameter of a core portion of a multiple mode optical fiber is in range from 50 micrometers ($\mu$m) to 100 $\mu$m, and the diameter of a core portion of a single mode optical fiber is about 9 $\mu$m. The larger the cross-section of light from each of the light-emitting modules is, the larger the cross-section of the light exiting from the optical coupling module is. Therefore, the optical coupling module will incompletely guide the light from the light-emitting module to the core portion of the corresponding optical fiber if the cross-section of light from the light-emitting module is too large. This decreases the optical coupling efficiency between the light-emitting modules and the optical fibers.

Therefore, it is desirable to provide a photoelectric conversion device and an optical fiber coupling connector having the photoelectric conversion device, which can overcome or alleviate the above-mentioned problems.

DETAILED DESCRIPTION

Figure 1:
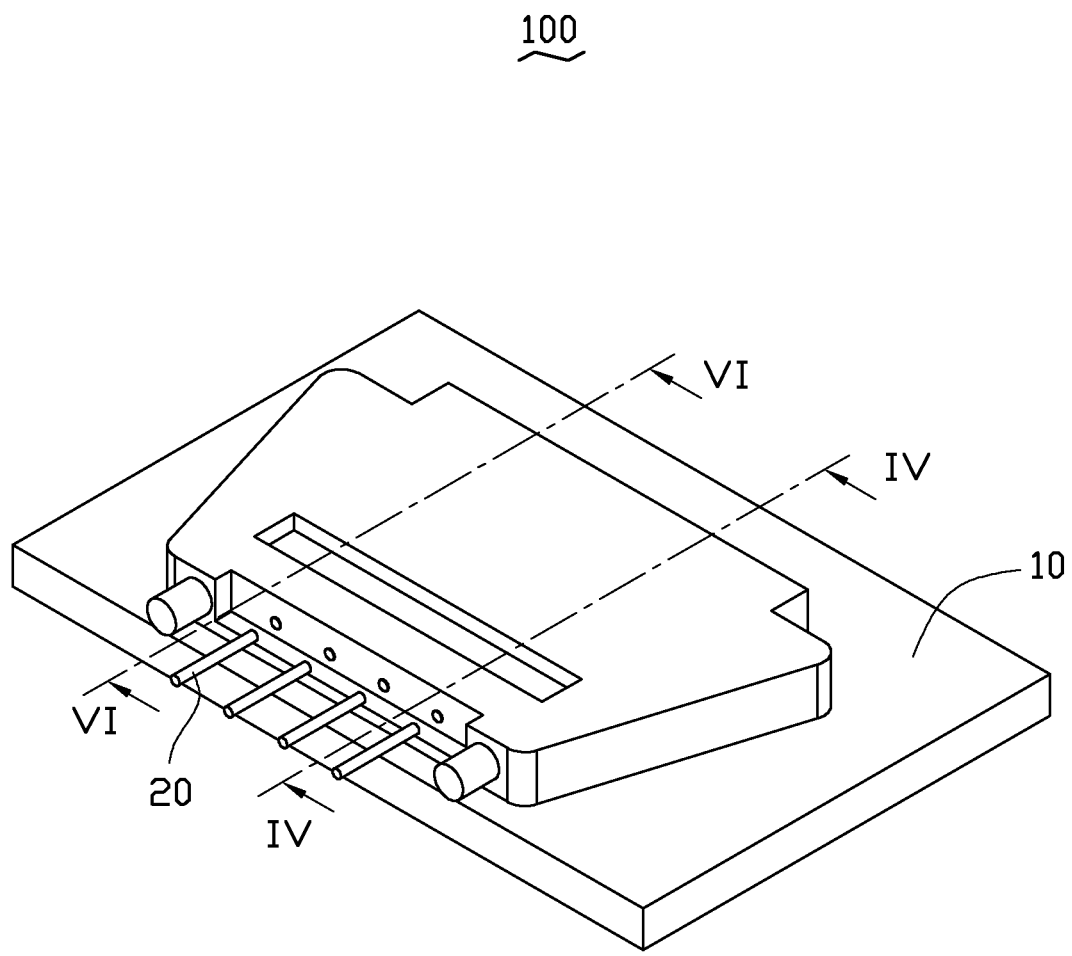
FIG. 1 is a schematic, isometric view of an optical fiber coupling connector, according to an exemplary embodiment.

FIG. 1 shows an optical fiber coupling connector 100 according to an exemplary embodiment. The optical fiber coupling connector 100 includes a photoelectric conversion device 10 and four optical fibers 20.

Figure 2:
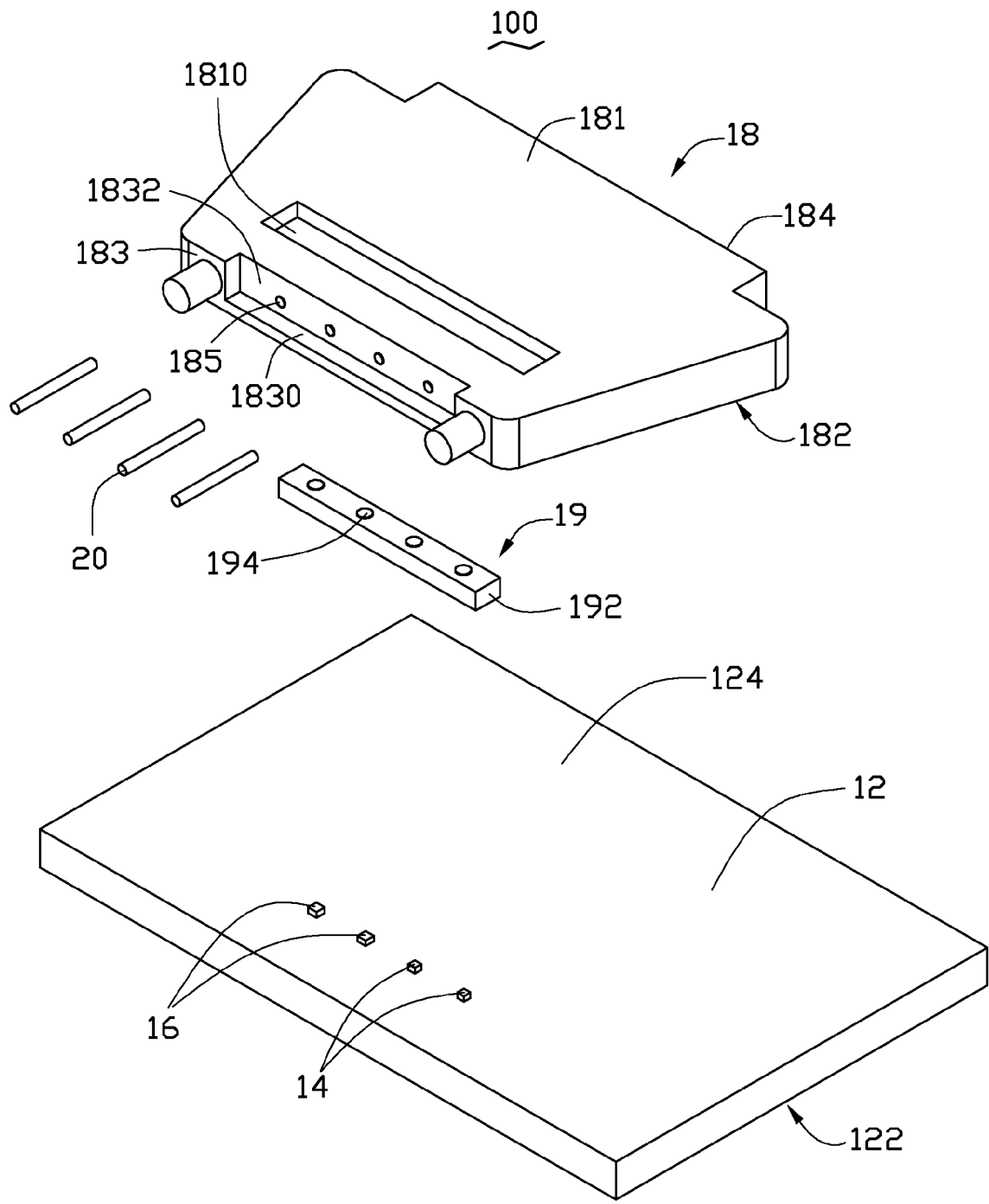
FIG. 2 is an exploded view of the optical fiber coupling connector of FIG. 1.
Figure 3:
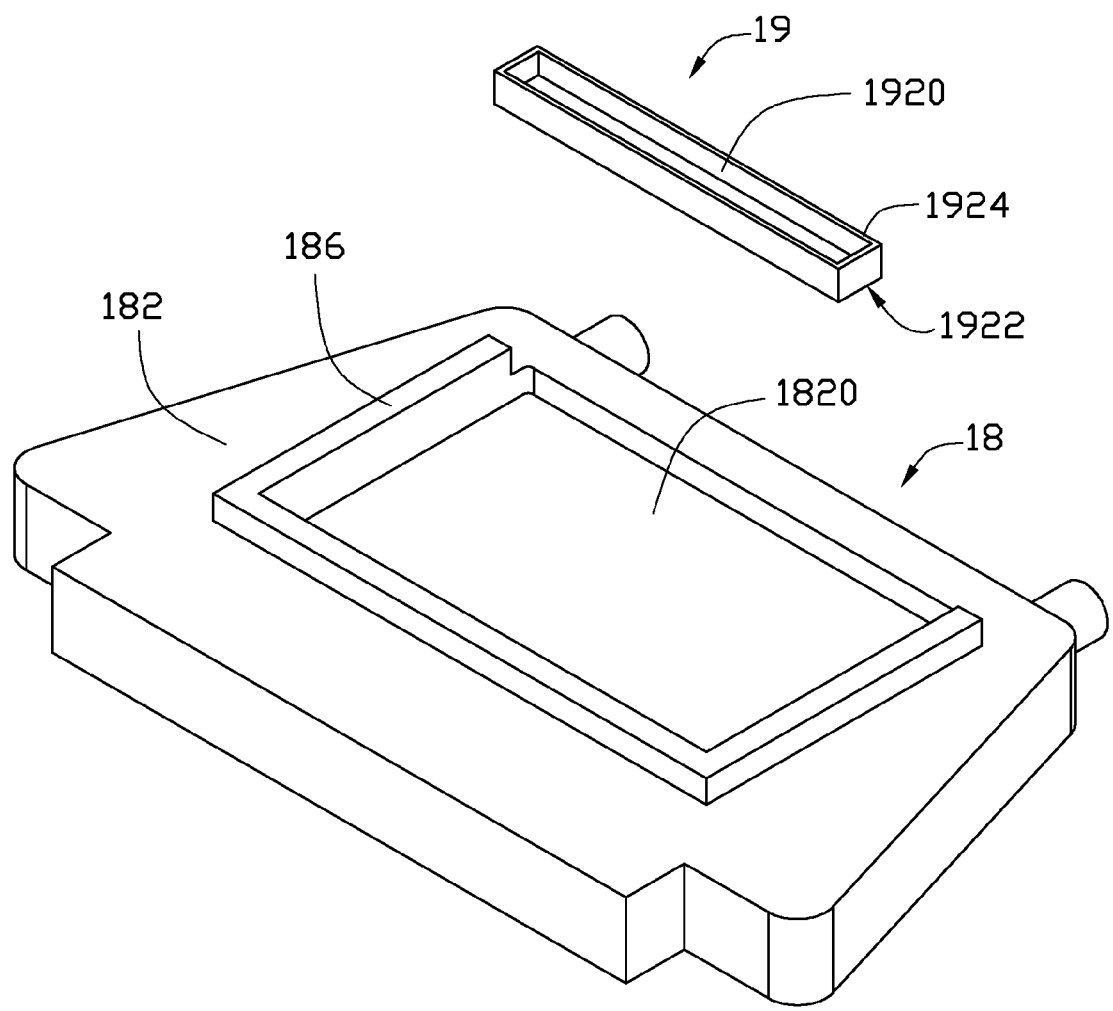
FIG. 3 is similar to FIG. 2, but partially viewed from another angle.

Referring to FIG. 2 together with FIG. 1, the photoelectric conversion device 10 includes a circuit board 12, two light-emitting modules 14, two light-receiving modules 16, an optical coupling module 18, and a lens strip 19.

The circuit board 12 includes a first surface 122 and a second surface 124. The first surface 122 and the second surface 124 are positioned at opposite sides of the circuit board 12, and the first surface 122 is substantially parallel to the second surface 124.

The two light-emitting modules 14 and the two light-receiving modules 16 are mounted on the second surface 124 and are electrically connected to the circuit board 12. In detail, the light-emitting modules 14 and the light-receiving modules 16 are arranged in a straight line and apart from each other. That is, the centers of the light-emitting modules 14 and of the light-receiving modules 16 are arranged in a straight line. In this embodiment, each of the light-emitting modules 14 is a vertical cavity surface emitting laser (VCSEL) diode and is configured for converting electric signals to optical signals and emitting light. Each of the light-receiving modules 16 is a photo diode and is configured for receiving light and converting optical signals to electric signals.

Referring to FIGS. 2-5, the optical coupling module 18 includes a top surface 181, a bottom surface 182, a front surface 183, a back surface 184, four first converging lenses 185, and a support 186.

The top surface 181 and the bottom surface 182 are positioned at opposite sides of the optical coupling module 18, and the top surface 181 is substantially parallel to the bottom surface 182. The front surface 183 and the back surface 184 are positioned at opposite sides of the optical coupling module 18, and the front surface 183 is substantially parallel to the back surface 184. The front surface 183 is interconnected between the top surface 181 and the bottom surface 182, and the back surface 184 is interconnected between the top surface 181 and the bottom surface 182.

The top surface 181 defines an elongated top recess 1810. The optical coupling module 18 further includes a first inner surface 1812, a second inner surface 1814, and a reflection surface 1816 in the top recess 1810. The first inner surface 1812 is positioned at the bottom of the top recess 1810, and is substantially parallel to the top surface 181. The second inner surface 1814 is positioned at a side of the top recess 1810, and is perpendicularly interconnected between the first inner surface 1812 and the top surface 181. The reflection surface 1816 is positioned at a side of the top recess 1810 opposite to the second inner surface 1814, and is obliquely interconnected between the first inner surface 1812 and the top surface 181.

The bottom surface 182 defines a rectangular bottom recess 1820. The optical coupling module 18 further includes a first optical surface 1822 at the bottom of the bottom recess 1820. The first optical surface 182 is substantially parallel to the top surface 181 and the bottom surface 182.

The front surface 183 defines a cutout 1830. The optical coupling module 18 further includes a second optical surface 1832 in the cutout 1830. The second optical surface 1832 is substantially parallel to the front surface 183 and the back surface 184. That is, the first optical surface 1822 is substantially perpendicular to the second optical surface 1832, and the reflection surface 1816 is oblique relative to the first optical surface 1822 and the second optical surface 1832. An included angle between a main plane of the first optical surface 1822 and a main plane of the reflection surface 1816 is about 45 degrees, and an included angle between a main plane of the second optical surface 1832 and a main plane of the reflection surface 1816 is about 45 degrees.

The first converging lenses 185 are formed on the second optical surface 1832 and are arranged apart from each other. In detail, the first converging lenses 185 are arranged in a straight line, and correspond to the light-emitting modules 14 and the light-receiving modules 16 one-to-one. In this embodiment, each of the first converging lenses 185 is a convex lens.

The support 186 is a frame having three sides. The support 186 depends from the bottom surface 182 away from the top surface 181. The support 186 extends along three edges of the bottom recess 1820 and surrounds three edges of the bottom recess 1820.

The lens strip 19 includes a transparent body portion 192 and four second converging lenses 194. The body portion 192 includes an upper surface 1922 and a lower surface 1924. The upper surface 1922 and the lower surface 1924 are positioned at opposite sides of the body portion 192, and the upper surface 1922 is substantially parallel to the lower surface 1924. The lower surface 1924 defines a rectangular receiving cavity 1920. The second converging lenses 194 are arranged in a straight line on the upper surface 1922. In this embodiment, each of the second converging lenses 194 is a convex lens.

The four optical fibers 20 correspond to the four first converging lenses 185. Each of the optical fibers 20 includes a cylindrical core portion 22 and a cladding layer 24 wrapping around the core portion 22. The four core portions 22 are aligned with the four first converging lenses 185, respectively.

When the optical fiber coupling connector 100 is assembled, first, the lens strip 19 is adhered onto the second surface 124 by an adhesive agent. In this situation, the light-emitting modules 14 and the light receiving modules 16 are received in the receiving cavity 1920 and are aligned with the second converging lenses 194. Second, the support 186 is adhered to the second surface 124 by an adhesive agent so that the optical coupling module 18 is mounted on the second surface 124. In detail, a receiving room 10*a* is formed between the first optical surface 1822 and the circuit board 12. The lens strip 19 is received in the receiving room 10*a* and faces the first optical surface 1822 and the reflection surface 1816. Third, the four core portions 22 are aligned with the four first converging lenses 185.

Figure 4:
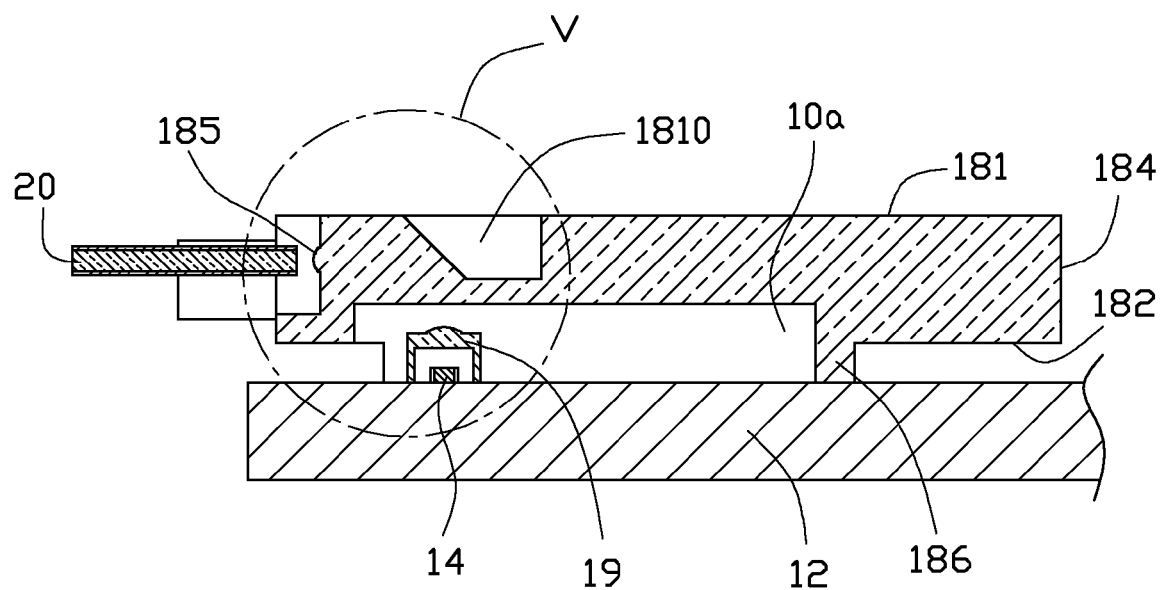
FIG. 4 is a cross-sectional view of the optical fiber coupling connector of FIG. 1, taken along the line IV-IV of FIG. 1.
Figure 5:
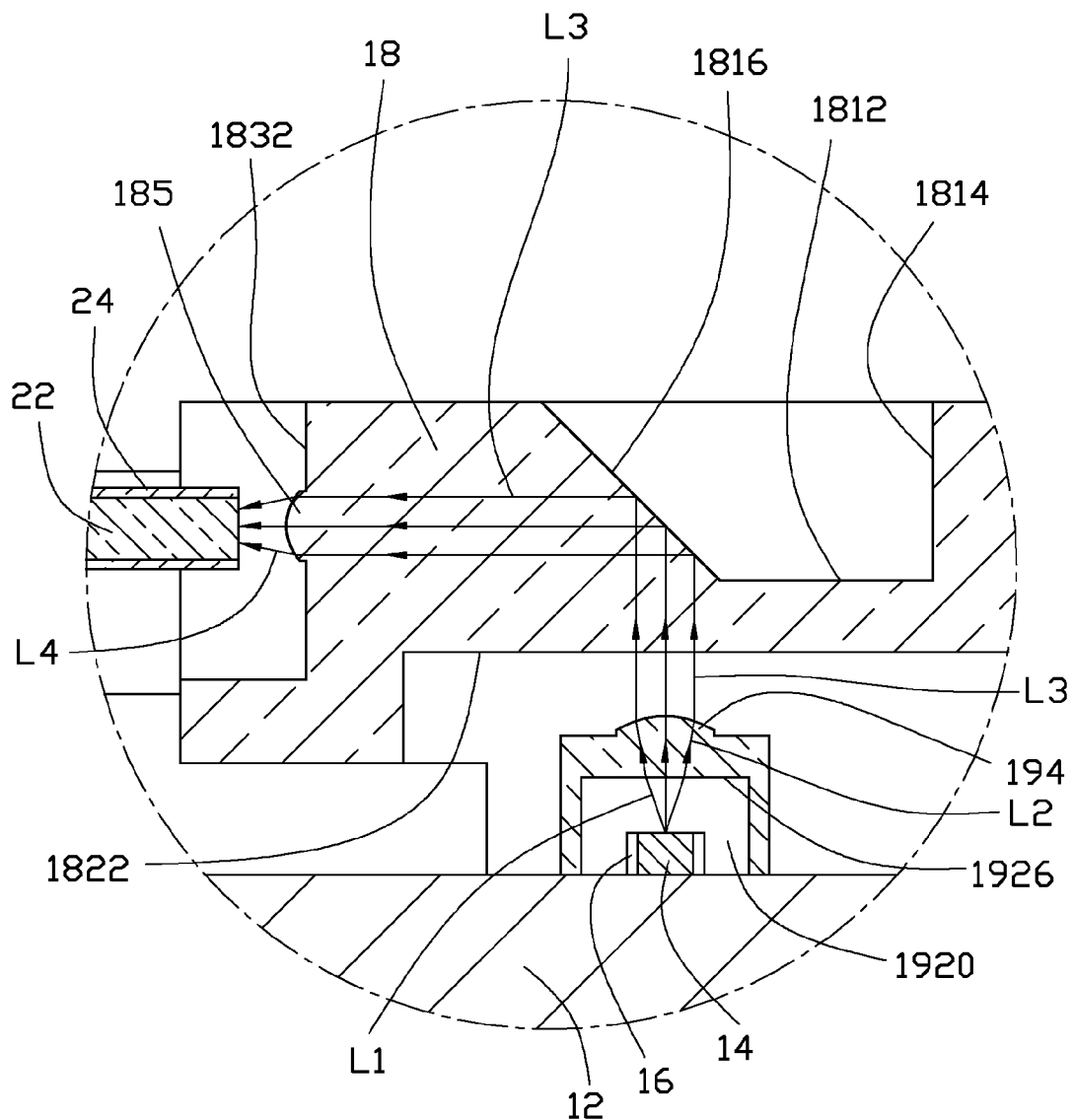
FIG. 5 is an enlarged view of section V of the optical fiber coupling connector of FIG. 4.

Referring to FIGS. 4-5, when the optical fiber coupling connector 100 is in use, electrical power is applied to the light-emitting modules 14 and the light-receiving modules 16 through the circuit board 12. Thus, light beams L1 emitted from each of the light-emitting modules 14 pass through the bottom 1926 of the receiving cavity 1920 and become inwardly contracted light beams L2. The contracted light beams L2 becomes parallel light beams L3 after passing through the respective second converging lenses 194. The parallel light beams L3 enter the optical coupling module 18 through the first optical surface 1822 and are reflected toward the first converging lenses 185 by the reflection surface 1816. The parallel light beams L3 are converged to light beams L4 through the first converging lenses 185. The converged light beams L4 enter the respective core portions 22 of the optical fibers 20. During this process, the converged light beams L4 entering the core portions 22 of the optical fibers 20 is greater than the converged light beams L4 entering the core portions 22 if the lens strip 19 is omitted because the lens strip 19 makes the cross-section of the contracted light beams L2 less than that of the light beams L1.

Figure 6:
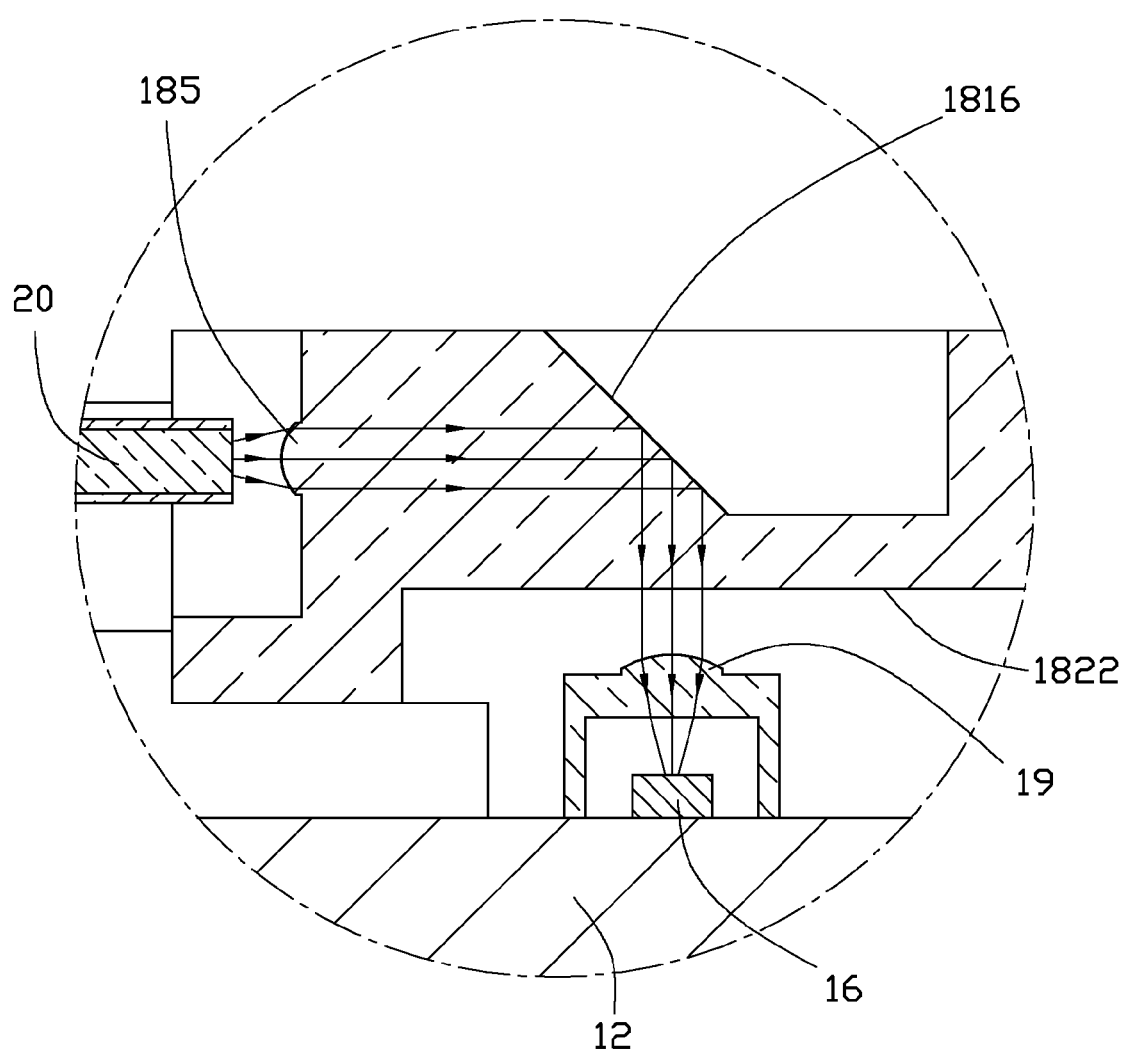
FIG. 6 is a partial, enlarged, cross-sectional view of the optical fiber coupling connector of FIG. 1, taken along the line VI-VI.

Accordingly, referring to FIG. 6, light beams from the optical fibers 20 become parallel light beams after passing the first converging lenses 185. The parallel light beams are reflected by the reflection surface 1816 toward the lens strip 19 and finally enter the light-receiving modules 16.

Even though numerous characteristics and advantages of the present embodiments have been set forth in the foregoing description, together with details of the structures and functions of the embodiments, the disclosure is illustrative only, and changes may be made in detail, especially in the matters of shape, size, and arrangement of parts within the principles of the disclosure to the full extent indicated by the broad general meaning of the terms in which the appended claims are expressed.

What is claimed is:

1. A photoelectric conversion device comprising:
   a circuit board;
   a plurality of light-emitting modules mounted on the circuit board;
   a plurality of light-receiving modules mounted on the circuit board and being apart from the light-emitting modules; and
   an optical coupling module mounted on the circuit board and comprising a first optical surface, a second optical surface perpendicular to the first optical surface, a reflection surface oblique relative to the first optical surface and the second optical surface, and a plurality of first converging lenses, the first converging lenses formed on the second optical surface and corresponding to the light-emitting modules and the light-receiving modules, the first optical surface facing the light-emitting modules and the light-receiving modules, the reflection surface configured for reflecting parallel light beams from the first optical surface toward the first converging lenses and for reflecting parallel light beams from the first converging lenses toward the first optical surface; and
   a lens strip mounted on the circuit board and comprising a body portion and a plurality of second converging lenses, the body portion comprising an upper surface and a lower surface opposite to the upper surface, the lower surface defining a receiving cavity, the second converging lenses formed on the upper surface, the light-emitting modules and the light-receiving modules received in the receiving cavity and aligned with the second converging lenses, and the lens strip configured for converting light beams from the light-emitting modules into parallel light beams and directing the light beams into the optical coupling module, and converging and directing light beams from the optical coupling module to the light-receiving modules,
   wherein the optical coupling module further comprises a top surface and a bottom surface opposite to the top surface, the top surface defines an elongated top recess having a first inner surface parallel to the top surface, a second inner surface perpendicularly interconnected between the first inner surface and the top surface, and the reflection surface obliquely interconnected between the first inner surface and the top surface, the bottom surface defines a bottom recess having the first optical surface at the bottom thereof, and the first optical surface is substantially parallel to the top surface and the bottom surface.

2. The photoelectric conversion device as claimed in claim 1, wherein a support depends from the bottom surface, the bottom recess is rectangular, the support extends along three edges of the bottom recess, the support is adhered to the circuit board thereby a receiving room is defined between the optical surface and the circuit board, and the lens strip is received in the receiving room.

3. The photoelectric conversion device as claimed in claim 2, wherein an included angle between a main plane of the first optical surface and a main plane of the reflection surface is about 45 degrees, and an included angle between a main plane of the second optical surface and a main plane of the reflection surface is about 45 degrees.

4. The photoelectric conversion device as claimed in claim 2, wherein the first converging lenses are arranged in a straight line, and the second converging lenses are arranged in a straight line corresponding to the first converging lenses.

5. The photoelectric conversion device as claimed in claim 4, wherein each of the first converging lenses is a convex lens, and each of the second converging lenses is a convex lens.

6. An optical fiber coupling connector comprising:
a photoelectric conversion device comprising:
   a circuit board;
   a plurality of light-emitting modules mounted on the circuit board;
   a plurality of light-receiving modules mounted on the circuit board and being apart from the light-emitting modules; and
   an optical coupling module mounted on the circuit board and comprising a first optical surface, a second optical surface perpendicular to the first optical surface, a reflection surface oblique relative to the first optical surface and the second optical surface, and a plurality of first converging lenses, the first converging lenses formed on the second optical surface and corresponding to the light-emitting modules and the light-receiving modules, the first optical surface face the light-emitting modules and the light-receiving modules, the reflection surface configured for reflecting parallel light beams from the first optical surface toward the first converging lenses and reflecting parallel light beams from the first converging lenses toward the first optical surface; and
   a lens strip mounted on the circuit board and comprising a body portion and a plurality of second converging lenses, the body portion comprising an upper surface and a lower surface opposite to the upper surface, the lower surface defining a receiving cavity, the second converging lenses formed on the upper surface, the light-emitting modules and the light-receiving modules received in the receiving cavity and aligned with the second converging lenses, and the lens strip configured for converting light beams from the light-emitting modules into parallel light beams and directing the light beams into the optical coupling module, and converging and directing light beams from the optical coupling module to the light-receiving modules; and
a plurality of optical fibers each comprising a core portion and a cladding layer, and the core portions aligned with the respective first converging lenses,
wherein the optical coupling module further comprises a top surface and a bottom surface opposite to the top surface, the top surface defines an elongated top recess having a first inner surface parallel to the top surface, a second inner surface perpendicularly interconnected between the first inner surface and the top surface, and the reflection surface obliquely interconnected between the first inner surface and the top surface, the bottom surface defines a bottom recess having the first optical surface at the bottom thereof, and the first optical surface is substantially parallel to the top surface and the bottom surface.

7. The optical fiber coupling connector as claimed in claim 6, wherein a support protrudes from the bottom surface, the support surrounds the bottom recess, the support is adhered to the circuit board thereby a receiving room is defined between the optical surface and the circuit board, and the lens strip is received in the receiving room.

8. The optical fiber coupling connector as claimed in claim 7, wherein an included angle between a main plane of the first optical surface and a main plane of the reflection surface is about 45 degrees, and an included angle between a main plane of the second optical surface and a main plane of the reflection surface is about 45 degrees.

9. The optical fiber coupling connector as claimed in claim 7, wherein the first converging lenses are arranged in a straight line, and the second converging lenses are arranged in a straight line corresponding to the first converging lenses.

10. The optical fiber coupling connector as claimed in claim 9, wherein each of the first converging lenses is a convex lens, and each of the second converging lenses is a convex lens.

* * * * *